(12) United States Patent
Berger et al.

(10) Patent No.: US 6,198,382 B1
(45) Date of Patent: Mar. 6, 2001

(54) TRANSPONDER FOR TRANSMITTING PROCESSED DATA TO A BASE STATION OVER LARGE DISTANCES AND AT A HIGH DATA TRANSFER RATE

(75) Inventors: Dominik J. Berger, Graz; Bernhard Czar, Graz-Gösting; Wolfgang Eber, Graz, all of (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/132,399

(22) Filed: Aug. 11, 1998

(30) Foreign Application Priority Data

Aug. 12, 1997 (EP) .................................................. 97890161

(51) Int. Cl.$^7$ ...................................................... H04Q 5/22
(52) U.S. Cl. ..................... 340/10.34; 455/343; 340/10.52
(58) Field of Search ......................... 340/825.54, 825.44, 340/10.34, 10.51, 10.52, 10.5; 455/343

(56) References Cited

U.S. PATENT DOCUMENTS 5,686,902 * 11/1997 Reis et al. ..................... 340/825.54

FOREIGN PATENT DOCUMENTS

0534559A1 3/1993 (EP) ............................. G06K/19/06

* cited by examiner

*Primary Examiner*—Michael Horabik
*Assistant Examiner*—Matsuichiro Shimizu

(57) ABSTRACT

A transponder has a memory, a data processor, a transmit memory and a transmission circuit. The memory stores data. In a transmit mode of the transponder, the data processor is operable in a normal-energy mode and an energy-saving mode. When the data processor is in the normal-energy mode, the data processor retrieves the data from the memory and processes the data, and the processed data is stored in the transmit memory. Thereafter, the data processor is controlled from the normal-energy mode to the energy-saving mode, and the transmission circuit reads out the stored processed data from said transmit memory and transmits the read out stored processed data to a base station.

9 Claims, 1 Drawing Sheet

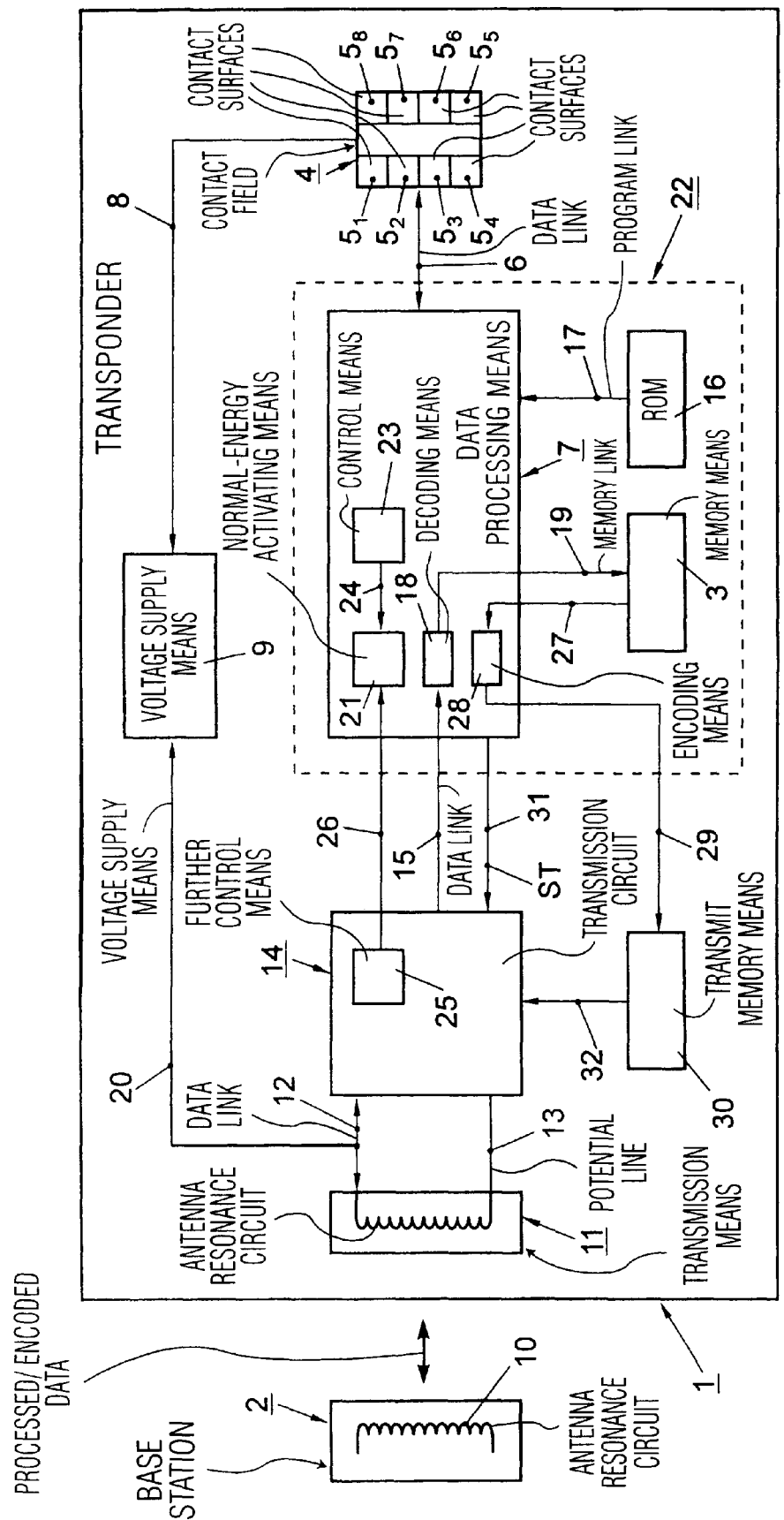

TRANSPONDER FOR TRANSMITTING PROCESSED DATA TO A BASE STATION OVER LARGE DISTANCES AND AT A HIGH DATA TRANSFER RATE

Transponder for transmitting processed data to a base station over large distances and at a high data transfer rate.

BACKGROUND OF THE INVENTION

1. Field of the Invention

The invention relates to a transponder for transmitting processed data to a base station comprising memory means from which data may be read out, and including data processing means which may be brought to a normal-energy operating mode in a transmit mode of the transponder and may be brought to an energy-saving mode in a transmit mode of the transponder, and to which data processing means may be applied data read out from the memory means to process the data and by which data processing means processed data may be delivered, and including transmission means by which the processed data corresponding to the processed data delivered by the data processing means can be transmitted to the base station.

2. Description of the Related Art

Such a transponder as defined in the opening paragraph is known, for example, from document EP 0 534 559 A1. This known transponder is not only arranged and suitable for transmitting but also for receiving data. With the known transponder, data read out from the memory means are processed in the data processing means in two transmit modes of the transponder, and processed data are fed to the transmission means for transmitting the processed data to a base station. In a first transmit mode, the data processing means, which are formed by a microcomputer in the known transponder, are brought to a normal-energy mode of operation in which they are driven with a relatively high clock frequency, so that the relatively high processing rate of the data processing means is achieved at which the data processing means, however, have a relatively high energy consumption. In a second transmit mode, the data processing means are brought to an energy-saving mode of operation in which the data processing means are driven with a relatively low clock frequency and therefore have a relatively low energy consumption, as a result of which a relatively large transmission range with the transponder to a base station is achieved. In this manner, a relatively large transmission range is achieved, it is true, but the data transmission of the processed data from the known transponder to a base station is effected at only a low data transfer rate because the data processing means in the energy-saving mode process the data only very slowly, so that, unfortunately, there is a relatively long data transmission period.

It should be noted that in the known transponder there is a third possibility of a transmit mode in which data may be transmitted at a high data transfer rate over a relatively large transmission range, but in which the data processing means formed by the microcomputer are not activated at all, so that data read out from the memory means cannot possibly be processed, for example, be encoded or checksums cannot be added to the data for the purpose of enhancing the data transmission security. In this third transmit mode of the known transponder, only an interface device is activated in lieu of the data processing means with which interface device it is only possible to read data from a memory and apply them to a transmission coil which is additionally necessary for carrying out this third transmit mode and thus represents additional expenditure.

SUMMARY OF THE INVENTION

It is an object of the invention to avoid afore-mentioned problems and improve a transponder as defined in the opening paragraph in a simple manner and practically without further expenditure. For achieving this object, in a transponder according to the invention there is provided that the data processing means, when the transponder is in a transmit mode, can be taken from its normal-energy mode to its energy-saving mode and that transmit memory means are provided which may be written and read out in this transmit mode of the transponder and by which transmit memory means the processed data delivered by the data processing means in the normal-energy mode in the transmit mode of the transponder can be stored before the processed data are actually transmitted, and that control means are provided by which, in this transmit mode, the data processing means can be controlled from their normal-energy mode of operation to their energy-saving mode of operation after the processed data have been stored in the transmit memory means and before processed data are actually sent, and that a transmission circuit is provided by which processed data stored in the transmit memory means can be read out from the transmit memory means and can be applied to the transmission circuit and by which circuit respective processed data can be delivered to the transmission means, and that, when data processing means including the transmission circuit are situated in their energy-saving mode, processed data read out from the transmit memory means and applied to the transmission circuit can be supplied to the transmission means to be transmitted to the base station. It is achieved in a particularly simple manner that the data processing means—by which an intelligent processing of data read out from the memory means, such as an encoding or a formation or addition of checksums and the like, is carried out—in their normal-energy mode of operation read out data from the memory means and process them at a high processing rate and that processed data are stored in the transmit memory means in preparation of the actual transmission of these processed data in the transmit mode of the transponder. During the actual transmission, when the data processing means are then advantageously controlled to their energy-saving mode, the transmission circuit transmits the processed data stored in the transmit memory means to the base station at a high transfer rate. Advantageously, the data processing means are operated in those time domains in which data are processed by the data processing means in the normal-energy mode of operation with a relatively high clock frequency and, therefore, have a high processing rate and, in further time domains, the data processing means in which domains processed data are transmitted to the base station, are controlled to their energy-saving mode and driven with a relatively low clock frequency with only a very low energy consumption. In consequence, with the transponder according to the invention, a communication may be effected—that is, a retrieval of data stored in the transponder memory means by the base station and a processing of these data, and a transmission of the processed data to the base station—at a high data transfer rate over large distances, which in many fields of application of transponders is most important. As a further advantage there should be observed that when the data processing means are controlled to their energy-saving mode, these data processing means consume very little energy in a steady manner and that, as a consequence, there is thus practically no variable energy consumption. Since any variable energy consumption in a transponder forms a variable load on the energy supply in the transponder, which variable load is superimposed as a noise signal, which is disturbing and may lead to data transmission errors, on a transmit signal sent from the transponder transmission means to the base station, the result of the fact that the data processing means in a transponder according to the invention continuously, thus evenly—thus not intermittently—have only very little energy consumption, is that the transmission circuit also consumes very little energy, which very small noise component cannot lead to data transmission errors. Consequently, a transponder according to the invention can transmit data over an extremely large distance at a high data transfer rate with satisfactory result and in an error-free manner to the base station. Such a transponder according to the invention is obviously not only arranged and suitable for the transmission but also for the reception of data.

In a transponder according to the invention, it has proved to be advantageous when, additionally, the transmission behavior of the transmission circuit can be controlled and the transmission circuit can be supplied with a control data by the data processing means which control data can control the transmission behavior of the transmission circuit, and the transmission circuit is arranged for reading the processed data from the transmit memory means in accordance with the control data applied to the transmission circuit. Such control data may contain, for example, an initial memory address and a final memory address of processed data stored in the transmit memory means. In such a case it is made possible for the transmission circuit to read out only such processed data stored in the transmit memory means from the transmit memory means to be supplied to the transmission means that are stored in a specific memory area of the transmit memory means, while the memory area is featured by the initial memory address contained in the control data and the end memory address contained in the control data. Data processed by the data processing means may be stored in a plurality of memory areas of the transmit memory means which areas are featured by initial memory addresses and end memory addresses; subsequently, one of these memory areas of the transmit memory means can be selected by the initial memory address and the end memory address contained in control data from the data to be transmitted to a base station which data are processed in the transmit mode of the transponder.

In a transponder according to the invention, it has proved to be advantageous when, additionally, the a part of the transmission circuit is arranged as further control means by which the data processing means can be controlled back from their energy-saving mode to their normal-energy mode. By providing the further control means in the transponder according to the invention, there is achieved that the transponder autonomously activates the normal-energy mode of operation of the data processing means when the transmission circuit has terminated the transmission of data read out from the transmit memory means. Because the further control means are included in the transmission circuit, the further control means may be realized in a very simple manner, because the end of the transmission may easily be detected in the transmission circuit.

In a transponder according to the invention, it has further proved to be advantageous when, additionally, the data processing means are formed by means of a microcomputer. In this manner, data processing means are obtained in which different software variants may be processed so that the transponder according to the invention may be adapted to many fields of application.

In a transponder according to the invention, it has proved to be advantageous when, additionally, a part of the microcomputer may be arranged as control means. As a result, highly simple control means for controlling the microcomputer in its energy-saving mode are provided.

The measures according to the invention may be implemented to advantage in an active transponder which has a battery for its energy supply, to reach an extremely large transmission range and to have an economical use of the energy stored in the battery. In a transponder according to the invention, it has proved to be highly advantageous when, additionally, the transponder is formed by a passive transponder which derives the energy it needs in the transmit mode from a received signal received by the transmission means. For that matter, it has proved to be highly advantageous to provide the measures according to the invention in a passive transponder in which the energy for operating the transponder, thus also the energy required in the transmit mode of the transponder, is obtained from the input signal of the transponder and in which the obtained energy is to be consumed economically in the transmit mode to obtain a large transmission range. The measures according to the invention provide a socalled remote coupling in which processed data can be transmitted with satisfactory result from a passive transponder to a base station over a relatively large distance of more than a meter.

In a transponder according to the invention, the processing of data in part of the processing stages of the data processing means controlled to their energy-saving mode of operation may be stopped so as to reduce the energy consumption. In a transponder according to the invention, however, it has proved to be highly advantageous when, in addition, the data processing means in their energy-saving mode are completely deactivated with the exception of normal-energy activating means contained therein. As a consequence, there is achieved in a simple manner that practically all the data processing means are deactivated in their energy-saving mode and only the normal-energy activating means continue to be activated for which an extremely low energy consumption is sufficient, so that there is an extremely low and also constant, thus invariable, energy consumption.

BRIEF DESCRIPTION OF THE DRAWINGS

The aspects defined above and further aspects of the invention will be apparent from the example of embodiment to be described hereinafter and will be explained with reference to this example of embodiment.

The invention will be further described with reference to the example of embodiment represented in the drawings, to which example of embodiment the invention is not restricted, however.

FIG. 1 shows, in essence, a transponder for transmitting data processed by the data processing means of the transponder, which data can be stored in the transmit memory means before they are actually transmitted, from which memory means the processed data can be read out with the aid of a transmission circuit after the data processing means were previously controlled to an energy-saving mode of operation.

DETAILED DSCRIPTION OF THE INVENTION

The FIG. 1 shows, in essence, a transponder for transmitting data processed by data processing means of the transponder which, before they are actually transmitted, can be stored in transmit memory means from which the processed data can be read out by a transmission circuit after the data processing means have previously been controlled to an energy-saving mode.

The FIG. 1 shows a transponder 1 for transmitting to a base station 2 processed data which, in the course of their processing, are subjected to, for example, an encoding and the like, and for receiving processed data from the base station 2. Such processed and, for example, also encoded data encoded during the processing may contain data representing amounts of money and may be stored in memory means 3 of the transponder 1. In such a case the transponder 1 is accommodated in a credit card for paying for articles, while the base station 2 is then formed by a cash desk.

When the transponder 1 is used for paying an amount of money for an article, the base station 2 is to be arranged for transmitting encoded data to the transponder 1, which data then contain an authorization code and the amount of money to be paid. After the authorization code has been checked, the amount of money to be paid is subtracted in the transponder from the amount of money represented by the data stored in the memory means 3. Subsequently, the transponder 1 sends encoded data to the base station 2, which data contain a confirmation of a deduction as a result of which the article is considered paid for in the base station 2. The data are always transmitted in encoded form to prevent a manipulation by an unauthorized person.

The transponder 1 has a contact field 4 which satisfies the ISO standard 7816 and by which the transponder 1 can communicate with further base stations in contact-bound manner. Data received over contact surfaces $5_1$ to $5_8$ are delivered by a first data link 6 to data processing means 7 and a supply voltage of the transponder 1 for the contact-bound communication delivered to voltage supply means 9 by a first supply voltage line 8. With the transponder 1, the contact-bound operation is used for crediting a respective amount of money which is added to the amount of money represented by the data stored in the memory means 3, because this operation is to be protected against a manipulation by unauthorized persons.

The base station 2 includes an antenna resonance circuit 10 for transmitting encoded data. When the transponder 1 is located within the receiving range of the base station 2, the antenna resonance circuit 10 of the base station 2 is inductively coupled to an antenna resonance circuit of the transponder 1 which here forms transmission means 11 of the transponder 1. Encoded data received by the transmission means 11 can be delivered to a transmission circuit 14 via a second data link 12 and a potential line 13, which transmission circuit is at the same time arranged as a receiving circuit. Encoded data received in the transmission circuit 14 can be delivered to the data processing means 7 by a third data link 15.

There should further be observed with respect to the memory means 3 that these means are advantageously formed by a so-called EEPROM.

A plurality of processing stages formed by software modules are realized in the data processing means 7 which data processing means are formed here by a microcomputer. The software modules which determine the functionality of the microcomputer and, consequently, the properties of the transponder 1 are stored in a read-only memory ROM 16. The microcomputer program read out by a program link 17 from the ROM 16 and containing the software modules determines the processing steps in the data processing means 7. A series of intelligent data processing operations can be executed in the data processing means 7 such as an encoding of data, a formation of a checksum, an addition of the checksum to a data set, a data error test and the like. In this respect, data processing by the data processing means 7 must be understood to mean that the data read out from the memory means 3 are not merely transmitted and are applied more or less unaffectedly to the transmission means 11 to be sent to a base station, but also that the data read out from the memory means 3 are subjected to an intelligent processing, for example, to a change, to an addition in that the checksum is added, and to similar operations.

In the data processing means 7 is included an access authorization stage (not further shown in the Figure), by which there can be detected with the aid of the encoded data transmitted from the base station 2 to the transponder 1 whether the user of the base station 2 is authorized to query data stored in the memory means 3. The data processing means 7 also include decoding means 18 to which may be applied received encoded data and which are arranged for decoding the received encoded data when there is a suitable key and for delivering decoded data. Decoded data may be further processed in the data processing means 7 and applied to the memory means 3 by a first memory link 19 and stored in the memory means 3.

A signal received by the transmission means 11 in the transponder 1 may be applied to the voltage supply means 9 via a second voltage supply means 20. The voltagie supply means 9 in the contactless mode of operation of the transponder 1 are arranged for obtaining energy from the received signal as this has already been known for a long time. A supply voltage obtained in the voltage supply means 9 in the contactless mode of operation, or a supply voltage applied to the voltage supply means 9 in the contact-bound mode of operation via the first voltage supply line 8 may be applied to the circuit sections of the transponder 1 for their power supply via supply lines which are not shown in the FIG. 1.

The data processing means 7 include normal-energy activating means 21 which are formed here by an interrupt stage and may be activated by means of a normal-energy mode of the data processing means 7, in which normal-energy mode all the processing stages of the data processing means 7 are activated and in which the data processing means 7 are operated with a relatively high clock frequency which corresponds to a standard operating frequency. Furthermore, with the aid of the normal-energy activating means 21, an energy-saving mode of the data processing means 7 may be activated in which only the normal-energy activating means 21 of the data processing means 7 are activated and in which the data processing means 7 are operated with the lower clock frequency than the previously mentioned standard operating frequency, so that they have less energy consumption. Furthermore, the data processing means 7 in the energy-saving mode do not carry out reading operations in the read-only memory 16 and no write and read operations in the memory means 3 formed by an EBPROM, as a result of which the read-only memory 16 and the memory means 3 do not have any energy consumption. Worded differently, this means that the data processing means 7, the memory means 3 and the read-only memory 16 form energy-saving means 22 which have practically no energy consumption in the energy-saving mode of the data processing means 7.

The data processing means 7 include control means 23 which are arranged for activating the energy-saving mode of the data processing means 7 via a first control line 24 and via the normal-energy activating means 21.

The transmission circuit 14 includes further control means 25 which are arranged for activating the normal-energy operating mode of the data processing means 7 via a second control line 26 and via the normal-energy activating means 21. The activation of the energy-saving mode and the normal-energy mode of the data processing means 7 will be further explained hereinafter.

When encoded data produced by the base station 2 are received in the transponder 1, and the access authorization stage of the data processing means 7 has detected that the base station 2 is authorized to receive the data stored in the memory means 3, the data stored in the memory means 3 can be applied to the data processing means 7 via a second memory line 27. The data processing means 7 are arranged for further processing the data read out from the memory means 3 with the aid of further processing stages not shown in FIG. 1. A further processing stage is then arranged for adding cryptographic checksums to the data read out from the memory means 3. Further processing stages in the processing means 7 are arranged for processing the data read out from the memory means 3 in dependence on the field of application of the transponder as this is widely known to a person skilled in the art and which will not be further discussed here. Part of the data processing means 7 is arranged as encoding means 28 to which may be applied data read out from the memory means 3 and possibly already processed, and which encoding means are arranged for delivering processed data which are then encoded. The encoding of data may be carried out by utilizing optional known cryptographic methods.

For preparing the actual transmission of at least encoded data, thus data processed in the data processing means 7 in a send mode of the transponder 1, data encoded and processed by the encoding means 28 can be delivered to transmit memory means 30 over a fourth data link 29 to store the processed data to be transmitted. The processed data to be transmitted are then stored in a memory area of the transmit memory means 30 which memory area is featured by an initial memory address and a final memory address. The transmit memory means 30 are advantageously formed by a so-called RAM; in certain applications they may also be formed by an EEPROM, however.

When all the processed data provided for transmission to the base station 2 are stored in the transmit memory means 30, the data processing means 7 send a control data ST over a third control line 31 to the transmission circuit 14. The control data ST contains the initial memory address and the final memory address and possibly further data. The control data ST can be used for controlling the transmission behavior of the transmission circuit 14.

The control means 23 included in the data processing means 7 control the normal-energy activating means 21 after the control data ST has been delivered by the data processing means 7 to the transmission circuit 14, so that, with the aid of the normal-energy activating means 21, the energy-saving mode of the data processing means 7 is activated. After the activation of the energy-saving mode of the data processing means 7, the preparations for a subsequent actual transmission of processed and encoded data are terminated.

It is advantageous for the control means 23 to be formed by a part of the microcomputer forming the data processing means 7, because the activation of the energy-saving mode of the data processing means 7—thus of the microcomputer—may only take place after the processed transmit data have been successfully stored in the transmit memory means 30 and after the microcomputer has applied the control data ST to the transmission circuit 14, and the end of these two operations can be simply detected in the microcomputer.

When the energy-saving mode is activated, the energy-saving means 22 have practically no energy consumption, so that the energy gained from the received signal in the voltage supply means 9 is practically available to the whole transmission circuit 14, the transmission means 11 and the transmit memory means 30 formed by a RAM when transmission actually takes place.

When the energy-saving mode is activated, only the normal-energy activating means 21 in the data processing means 7 are activated, which activating means exclusively monitor the occurrence of a control data on the second control line 26. During this continuous monitoring by the normal-energy activating means 21 and the data processing means 7, the energy consumption of the data processing means 7 is only very little and practically constant, thus invariable. As each variable energy consumption causes a variable load on the supply voltage produced in the voltage supply means 9, as a result of which there are slight fluctuations of the supply voltage, a noise signal occurs caused by variations of the supply voltage in known transponders when processed data are transmitted, which noise signal is superimposed on the data to be transmitted and may lead to data transmission errors as an adverse effect. On the other hand, in the transponder according to the invention, the slight and additionally always invariable energy consumption of the data transmission means 7 advantageously lead to no variations of the supply voltage, so that no noise signal is superimposed on the processed data to be transmitted and, in consequence, no data transmission errors caused by such a noise signal occur. In this manner, the transponder 1 can transmit over extremely large distances to the base station 2 in an error-free manner.

After the energy-saving mode has been activated for the data transmission means 7, the actual transmission in the transmit mode is activated in the transponder 1, in which transmit mode the transmission circuit 14, in accordance with a control data ST applied thereto, reads processed transmit data from the initial memory address of the transmit memory means 30 over a fifth data link. The processed, thus at least encoded, data to be read out and transmitted by the transmission circuit 14 are applied to the transmission means 11 over the second data link 12 and the potential line 13 which transmission means transmit the processed transmit data to the base station 2.

When the final memory address is reached by the transmission circuit 14 when the processed transmit data are read out from the transmit memory means 30, the transmit mode is terminated after the termination of the transmission of the processed data that have been read out. Subsequently, the further control means 25 in the transmission circuit 14 activate the normal-energy mode in the data processing means 7 and, in consequence, activate the normal-energy mode of the energy-saving means 22.

This advantageously achieves that in the transmit mode of the transponder 1, the energy obtained from a received signal in the voltage supply means 9 is practically completely available to the stages of the transponder 1 that are certainly necessary for transmitting data, more particularly processed and at least encoded data. This makes a so-called remote coupling possible in which processed data can be transmitted error-free by a passive transponder over a relatively large distance of more than one meter to a base station with satisfactory result. The transmission circuit 14 is here practically totally arranged as a hardware circuit which features an extremely small energy consumption and transmits at a very high data transfer rate.

The further control means 25 provide that the transponder 1 is independently arranged for activating the normal-energy mode of the data processing means 7 via the normal-energy activating means 21 and thus need not be reset to its normal-energy mode by a wake-up pulse applied to the transponder 1, for example, via the contact field 4. Consequently, the transponder 1 may vary without restriction between its normal-energy mode and its energy-saving mode and may thus transmit without restriction processed data over relatively large distances in a secured and error-free manner.

The structure of the transmission circuit 14 as a transmission circuit whose behavior can be controlled makes it possible for the transmission circuit 14 to read out only those processed data stored in the transmit memory means 30 to be sent to the transmission means 11 that are stored in a certain memory area of the transmit memory means 30, which certain memory area is featured by an initial memory address contained in the control data ST and by a final memory address contained in the control data ST.

As the further control means 25 are included in the transmission circuit 14, extremely simple further control means 25 are realized as it is easily possible in the transmission circuit 14 to detect the end of the actual transmission in the transmit mode.

It should be noted that the memory means 3 and the transmit memory means 30 may also be formed by a respective memory area in a single memory.

Furthermore, it should be noted that the control data ST can control the transmission behavior of the transmission circuit 14 also as regards the transmission range, where then transmissions take place to a base station either over a relatively large distance or over an only relatively short distance, depending on the control data ST.

Furthermore, it should be noted that the transponder may also include transmission means working by way of capacitors which may be coupled for transmitting data by capacitor-structured transmission means included in a base station 2.

It should further be noted that the transmission circuit 14 also includes further processing means, for example, further encoding means which further process the processed transmit data read out from the transmit memory means 30 and optionally additionally encode and transfer respective encoded data to the transmission means 11 to be transmitted to the base station 2.

A further observation may be made that the processing means 7 can also apply control data ST to the transmission circuit 14 in preparation of the actual transmission in the transmit mode and only subsequently provide that the processed transmit data are stored in the transmit memory means 30.

Finally, it should be noted that the data processed by the data processing means 7 need not solely be encoded data. It is possible for the data read out from the memory means 3 to be transferred from the data processing means 7 in uncoded manner to the transmit memory means 30 and from there to the transmission circuit 14, and each transferred data record may additionally obtain a cryptographic checksum for data protection purposes when the data have accordingly been processed in the data processing means 7.

What is claimed is:

1. A transponder for transmitting processed data to a base station, the transponder comprising memory means from which data are readable, data processing means which are operable, in a transmit mode of the transponder, in a normal-energy operating mode and in an energy-saving mode, to which data processing means data read out from the memory means are applicable in order to process the data and by which data processing means processed data are deliverable, and transmission means by which the data corresponding to the processed data delivered by the data processing means are transmitted to the base station, the data processing means, when the transponder is in the transmit mode, being controllable from the normal-energy mode to the energy-saving mode, the transponder further comprising transmit memory means which is readable and writeable, the transmit memory means storing the processed data when the data processing means in the normal-energy mode before the processed data are transmitted, control means for controlling the data processing means from the normal-energy mode of operation to the energy-saving mode of operation after the processed data have been stored in the transmit memory means and before the processed data are sent, a transmission circuit configured to read out the stored processed data from the transmit memory means and to deliver the read out stored processed data to the transmission means for transmission to the base station, the data processing means being in the energy-saving mode during the transmission.

2. A transponder as claimed in claim 1, wherein a transmission behavior of the transmission circuit is controllable and the transmission circuit is supplied with control data by the data processing means the control data controlling the transmission behavior and the transmission circuit being arranged for reading the processed data from the transmit memory means in accordance with the control data.

3. A transponder as claimed in claim 2, wherein a part of the transmission circuit is arranged as further control means by which the data processing means is controlled back from the energy-saving mode to the normal-energy mode.

4. A transponder as claimed in claim 1, wherein the data processing means is a microcomputer.

5. A transponder as claimed in claim 4, wherein a part of the microcomputer is arranged as control means.

6. A transponder as claimed in claim 1, wherein the transponder is a passive transponder which derives the energy it needs in the transmit mode from a received signal.

7. A transponder as claimed in claim 1, wherein the data processing means when in the energy-saving mode is completely deactivated with the exception of normal-energy activating means comprised therein.

8. A transponder comprising:
    a memory storing data;
    a data processor, in a transmit mode of said transponder said data processor being operable in a normal-energy mode and an energy-saving mode, said data processor being controlled to retrieve said data from said memory and to process said data when said data processor is in said normal-energy mode;
    a transmit memory controlled to store said processed data when said data processor is in said normal-energy mode, the data processor being controlled from said normal-energy mode to said energy-saving mode after storage of said processed data; and
    a transmission circuit configured to read out said stored processed data from said transmit memory and to transmit said read out stored processed data to a base station, said stored processed data being read out when said data processor is in said energy-saving mode.

9. A transponder as claimed in claim 8, wherein in said normal-energy mode said data processor is clocked at a substantially higher clock rate than in said energy-saving mode.

* * * * *